US010934102B2

United States Patent
Sigrist et al.

(10) Patent No.: US 10,934,102 B2
(45) Date of Patent: Mar. 2, 2021

(54) ORDER-PICKING INSTALLATION FOR THE ORDER PICKING OF DIFFERENT ITEMS, IN PARTICULAR ITEMS WHICH CAN BE TRANSPORTED IN A HANGING STATE, AND METHOD FOR OPERATING SUCH AN ORDER-PICKING INSTALLATION

(71) Applicant: FERAG AG, Hinwil (CH)

(72) Inventors: Sergio Sigrist, Hinwil (CH); Francisco Javier López, Rüti (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 16/631,792

(22) PCT Filed: Jul. 16, 2018

(86) PCT No.: PCT/EP2018/069214
§ 371 (c)(1),
(2) Date: Jan. 16, 2020

(87) PCT Pub. No.: WO2019/016120
PCT Pub. Date: Jan. 24, 2019

(65) Prior Publication Data
US 2020/0172346 A1 Jun. 4, 2020

(30) Foreign Application Priority Data

Jul. 20, 2017 (CH) .................................... 00947/17

(51) Int. Cl.
*B65G 47/51* (2006.01)
*B07C 5/38* (2006.01)
*B65G 1/04* (2006.01)
*B65G 1/137* (2006.01)
(Continued)

(52) U.S. Cl.
CPC ............ *B65G 47/5145* (2013.01); *B07C 5/38* (2013.01); *B65G 1/0457* (2013.01);
(Continued)

(58) Field of Classification Search
CPC .............. B65G 47/5145; B65G 1/0457; B65G 1/1378; B65G 47/5113; B65G 2201/0229;
(Continued)

(56) References Cited

U.S. PATENT DOCUMENTS 5,072,822 A * 12/1991 Smith .................... B07C 5/3412
198/349
5,799,800 A 9/1998 Lux
(Continued)

FOREIGN PATENT DOCUMENTS

DE 43 35 637 C1 6/1995
DE 94 06 061 U1 8/1995
(Continued)

OTHER PUBLICATIONS

Epo (Riswijk, NL), English language version of the International Search Report, Form PCT/ISA/210, for International Application PCT/EP2018/069214, dated Nov. 2, 2018 (3 pages).

*Primary Examiner* — Mark A Deuble
(74) *Attorney, Agent, or Firm* — Pauley Erickson & Swanson

(57) ABSTRACT

An order-picking installation for the order picking of items, in particular items transported in a hanging state, includes at least one supply station having a plurality of parallel supply locations, by which the items to be picked are supplied into the order-picking installation, and at least one dispatch station having a plurality of parallel dispatch locations, by which the picked items are discharged for dispatch, wherein at least one interim store is provided, for the order picking of the items, between the supply station and the dispatch station. The interim store includes a dynamic store for the interim storage of the items provided for order picking as well as a retrieval store, arranged downstream of the dynamic store, and intended for storing items which have been removed from the dynamic store and pre-sorted in the (Continued)

process, the dynamic store and the retrieval store arranged within a common circulatory conveyor.

24 Claims, 12 Drawing Sheets

(51) Int. Cl.
    *B65G 47/61* (2006.01)
    *B65G 37/02* (2006.01)
    *B65G 17/20* (2006.01)
(52) U.S. Cl.
    CPC ........... *B65G 1/1378* (2013.01); *B65G 17/20* (2013.01); *B65G 37/02* (2013.01); *B65G 47/5113* (2013.01); *B65G 47/61* (2013.01); *B65G 2201/0229* (2013.01)
(58) Field of Classification Search
    CPC .. B65G 1/1371; B65G 47/5109; B65G 37/02; B65G 1/0478; B65G 1/08; B65G 19/025; B65G 47/61; B65G 17/20; B07C 5/38; B07C 5/36
    See application file for complete search history.

(56) References Cited

U.S. PATENT DOCUMENTS

| | | | | |
|---|---|---|---|---|
| 6,050,421 | A * | 4/2000 | Hansen | B07C 5/3412 |
| | | | | 198/465.4 |
| 2014/0303770 | A1* | 10/2014 | Wend | B65G 1/0457 |
| | | | | 700/215 |
| 2018/0297620 | A1* | 10/2018 | Murakami | B65G 35/06 |
| 2019/0054587 | A1* | 2/2019 | Wahren | B65G 43/10 |
| 2019/0291968 | A1* | 9/2019 | Gallati | B65G 43/10 |
| 2020/0156876 | A1* | 5/2020 | Schnadwinkel | B65G 47/57 |

FOREIGN PATENT DOCUMENTS

| | | |
|---|---|---|
| DE | 695 00 497 T2 | 1/1998 |
| DE | 695 01 159 T2 | 4/1998 |
| DE | 198 54 629 A1 | 5/1999 |
| DE | 201 03 664 U1 | 6/2001 |
| DE | 100 39 394 C1 | 9/2001 |
| DE | 10 2011 103194 A1 | 12/2012 |
| EP | 0 582 224 A1 | 2/1994 |
| EP | 0 627 371 A1 | 12/1994 |
| EP | 2 581 329 A1 | 4/2013 |
| EP | 2 714 552 | 4/2014 |
| EP | 2 789 555 A1 | 10/2014 |
| EP | 2 886 494 A1 | 6/2015 |
| WO | WO 95/27672 A1 | 10/1995 |
| WO | WO 01/47792 A2 | 7/2001 |
| WO | WO 03/031291 A1 | 4/2003 |
| WO | WO 2013/029192 A1 | 3/2013 |
| WO | WO 2014/053380 A1 | 4/2014 |
| WO | WO 2016/030273 A1 | 3/2016 |
| WO | WO 2016/030275 A1 | 3/2016 |
| WO | WO 2017/027897 A1 | 2/2017 |

* cited by examiner

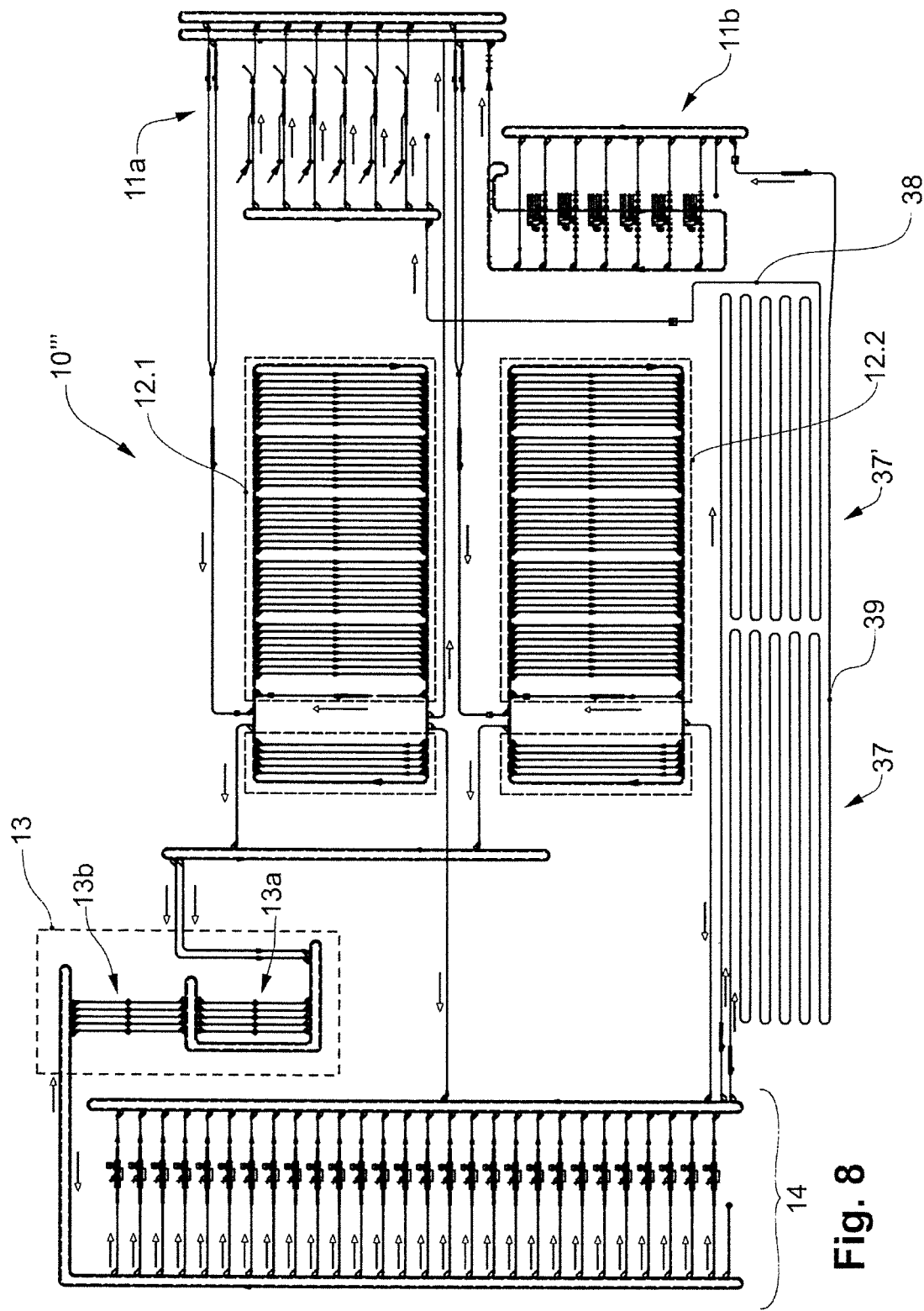

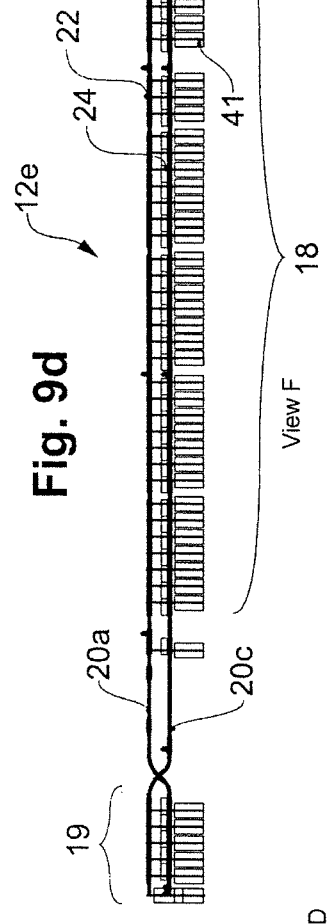
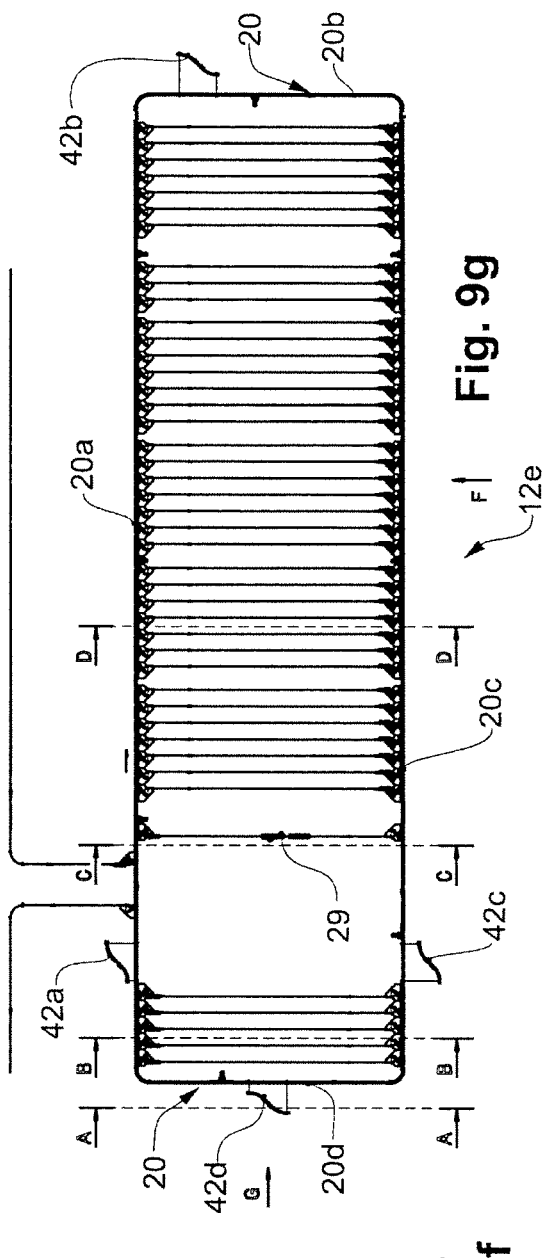
Fig. 9a Fig. 9b Fig. 9c Fig. 9d Fig. 9e Fig. 9f Fig. 9g

ORDER-PICKING INSTALLATION FOR THE ORDER PICKING OF DIFFERENT ITEMS, IN PARTICULAR ITEMS WHICH CAN BE TRANSPORTED IN A HANGING STATE, AND METHOD FOR OPERATING SUCH AN ORDER-PICKING INSTALLATION

BACKGROUND OF THE INVENTION

Field of the Invention

The present invention relates to the field of logistics. Said present invention relates to an order-picking installation for the order-picking of different goods, in particular goods which can be transported in a suspended state.

Said present invention furthermore relates to a method for operating such an order-picking installation.

Discussion of Related Art

In the course of the growing flows of goods and the changing way of the distribution and supply of goods, logistics problems and solutions are becoming ever more important. The goods stored and held ready in large warehouses, in particular also high-bay warehouses, are to be retrieved, assembled so as to form goods consignments, and delivered within the shortest possible time after the order is placed. An important sub-aspect of this handling of goods is the order-picking, that is to say the assembling of specific sub-quantities (items) from a provided overall quantity (assortment) by virtue of orders. This herein can be a customer order or else a production-related order.

There are a multiplicity of proposed solutions pertaining to issues of order-picking in the prior art.

Publication DE 4335637 C1 discloses a sorting installation for sorting individual pieces by way of collection zones and accumulator lines which are connected to a continuous conveying device, having a scanning apparatus as a component part of a control installation for scanning an identification number of an individual piece to be sorted, said identification number encoding specific identification features; deflection installations ahead of the accumulator lines, and one or a plurality of injection locations within an injection installation after the collection zones, characterized by the following features: (a) an assignment installation as a component part of a control installation for assigning the identification number to a placeholder number which includes the desired position in the flow of the individual pieces in the following collection zones, accumulator lines, and injection locations; (b) a first collection zone, adapted to the batch size(s) of the individual pieces be sorted, for receiving all of the individual pieces of one or a plurality of batches that are provided with a placeholder number, wherein the first collection zone contains m accumulator lines for the individual pieces according to a first component part of the placeholder number, said first component part being a pre-sorting feature, wherein each accumulator line has a receiving capacity q for the object to be sorted and m and q are integers; (c) a second, third, and fourth collection zone having a number of n accumulator lines in each collection zone according to a second, third, and fourth component part of the placeholder number, said component part being in each case a further differentiating pre-sorting feature, wherein the accumulator lines have a respective receiving capacity r and n and r are integers; (d) control elements as a component part of a control installation having a definition of the scanned individual pieces in such a manner that the batch of constant numerical size contains the corresponding number of individual pieces which run out of the sorting installation in a predefined sequence, and a blocking feature after receiving q=n<3> individual parts in each individual accumulator line in the first collection zone and after receiving r=n<2> individual pieces in each individual accumulator line in the second, third, of fourth collection zone; (e) an ejection installation after the fourth collection zone for the pre-sorted individual pieces, having a second assigning installation as a component part of the control installation for assigning the placeholder number to the specific injection location which corresponds to the predefined fifth component part of the placeholder number; wherein (f) the number m of accumulator lines in the first collection zone, the holding capacity q of an accumulator line in the first collection zone, the number n of the accumulator lines in each further collection zone, the holding capacity r of the accumulator lines in the further collection zones correlate in a specific manner to the sorting installation configuration M.

Publication EP 582224 A1 shows a method for sorting a plurality of individually conveyed objects in an overhead conveyor installation, wherein the objects in an unsorted state circulate on a first conveying circuit and from there are individually and in a self-acting manner transferred to at least one second conveying path and are assembled so as to form groups, wherein the second conveying path is configured as a second conveying circuit on which the objects circulate, and wherein a turnout that is capable of being switched in a self-acting manner is disposed between the first and the second conveying circuit.

Publication DE 9406061 U1 discloses a sorting installation for sorting individually conveyed objects, in particular an overhead conveyor installation, having two conveying circuits which revolve in opposite directions and convey the objects to be sorted according to their sequence, a turnout assembly by way of which the objects are capable of being transferred individually from one conveying circuit to the other conveying circuit being provided between said two conveying circuits, said turnout assembly being capable of being switched in a self-acting manner. The two conveying circuits as a conveying circuit pair are disposed on both sides of an additional conveyor section, the conveying direction thereof at the level of the turnout assembly being congruent with the conveying direction of the conveying circuit, and the turnout assembly being configured for transferring the objects selectively from the conveyor section to each of the conveying circuits, and from each of the conveying circuits to the conveyor section.

In this way, the objects arriving in an unsorted state on the conveyor section by way of the turnout assembly can be transferred, for example selectively and optionally, to one of the two conveying circuits and thereon be collected in groups, for example, thereafter the groups, sorted into groups, are successively transferred back to the conveyor section. By selectively transferring the objects from the one conveying circuit to the other conveying circuit, from the latter back to the first conveying circuit or onto the conveyor section, numerous additional sorting criteria can be met, for example the sequence of the objects within the groups can be changed. It is also possible to allow the objects on the conveyor section to selectively pass the turnout assembly without being transferred to the one or the other conveying circuit.

A similar sorting installation is known from publication WO 95/27672 A1.

Publication DE 10039394 C1 describes a sorting installation for sorting a plurality of objects in at least three sorting passes, having: an input station for inputting the objects to be sorted into the sorting installation; an output station for outputting the objects to be sorted from the sorting installation; and a plurality of accumulator sections on which the objects are in each case accumulated until a respective sorting pass has been completed. Said sorting installation is distinguished by dividing the accumulator sections between a first and a second block of accumulator sections; a first transport section which connects the input station to the first block of accumulator sections in such a manner that said accumulator sections are capable of being filled by the input station in a first sorting step; a second transport section which connects the first block to the second block in such a manner that the objects in a second sorting pass are transferred directly from the first block to the second block; and a third transport section which connects the second block to the first block in such a manner that the objects in a third sorting pass are transferred directly from the second block back to the first block.

Publication DE 20103664 U1 discloses a conveyor system for articles in a warehouse which on sliding rails are displaceable on carriers provided with hooks, in particular clothes hangers, having a temporary store for freshly incoming articles, and a sorting system for sorting the articles into individual collection locations according to arbitrary criteria. The temporary store herein is formed by at least one sorting store having a continuous conveyor section that is closed in an annular manner.

Publication EP 2581329 A1 shows an overhead track installation for the order-picking of orders having at least one piece of goods assigned to a respective order and/or for handling returns, having trolleys, as well as having supply locations, a batch buffer having a plurality of sections and packing locations, wherein the supply locations, the batch buffer and the packing locations are connected to one another by overhead track reels, and wherein the trolleys and the goods comprise identification installations. The overhead track installation herein comprises a management system; for identifying and temporarily linking a trolley to a piece of goods, identification detection installations for a trolley and the goods are disposed in the region of the supply location and of the packing location, and the identification detection installations are connected to the management system.

Publication EP 2714552 B1 discloses a distribution installation which is used in particular in the case of overhead conveyors, and is used, for example, for assembling a consignment of pieces of apparel which can be stored on hangers as suspended goods in an overhead store. The distribution installation can also be used in the B2B and B2C sectors, for example in that suspended bags or transport bags which are suitable for receiving piece goods such as, for example, cosmetics, pharmaceuticals, or similar, are conveyed in a suspended state.

The known distribution installation is assembled from a few conveyor elements of technically simple construction, in particular exclusively from straight sections, curved sections, and "simple" turnouts. Of course, height differentials can be overcome by means of elevators or similar. The distribution installation is very compact. The spacings between individual sections of the storage carousels as well as between the storage carousels per se can be chosen so as to be very small. The investment costs are lower than in the case of conventional systems, in particular because standard components are used. The system is continuously driven. Said system does not require any ascending and descending sections and thus in the preferably vertical alignment is extremely space-saving. Said system likewise comprises 180° curved sections which, as opposed to the prior art, however simultaneously function as a turnout.

The known distribution installation is often used, for example, in order-picking installations. The order-picking installation can comprise an incoming goods bay, a store, the distribution installation, an optional sorting unit, as well as an outward goods bay. Said components of the order-picking installation are connected to one another by way of conveyor technology. According to EP2714552 B1, order-picking instructions can be processed by way of the installation. The term "order-picking" herein is understood to be the assembly of piece goods so as to form an (order-picking) instruction. The order-picking has the object of assembling sub-quantities from an overall quantity of goods (assortment) by virtue of requirements (instructions). An instruction is composed of one or a plurality of instruction positions which are also referred to as instruction lines, or order lines, respectively. An instruction line indicates a respective quantity of an article. An order batch is a collection of a plurality of instructions so as to form one processing batch. A batch is thus a collection of a plurality of orders so as to form an orderly quantity or list of instructions. In the batch operation, instructions are initially collected and sorted, so as to then be sequentially processed in one pass, that is to say in a batch. The known installation is used in particular in the internet commerce sector (B2B, B2C etc.).

Publication WO 2014/053380 A1 describes a portable conveyor technology installation having a conveyor technology of modular construction, in particular having a modular overhead conveyor technology, and is achieved by way of a multiplicity of transport modules which are in each case formed from a multiplicity of previously installed and previously tested conveyor technology components, wherein the modules are disposed beside one another and/or on top of one another so as to be directly adjacent and so as to in an interconnected state conjointly form the installation, wherein the conveyor technology comprises: a multiplicity of conveyor sections which in terms of a material flow conjointly form a predefined conveyor section profile, wherein each of the conveyor sections comprises a separate machine frame; at least one drive; at least one control installation, and one transport means which by means of the at least one drive is movable along the conveyor section profile so as to transport load carriers, preferably suspended hangers, bags, or trolleys, through the installation; and wherein each module comprises: standardized external dimensions; a support construction of which the dimensions are adapted to the standardized external dimensions; and at least one of the conveyor sections, wherein the machine frame of each of the conveyor sections is permanently connected to the support construction, preferably along a uniform grid.

Each of the modules comprises at least parts of an (overhead) conveyor technology. Load carriers such as, for example, bags or hangers, are transported in a suspended state by way of the conveyor technology. Overhead conveyors are utilized, for example, in the apparel industry for transporting pieces of apparel within the factory. The pieces of apparel can be transported in a suspended or lying state. When the pieces of apparel are transported in a suspended state on the hangers, this is referred to as suspended goods. When the pieces of apparel are transported in a lying state, the bags are used. This is then referred to as lying goods which are placed in the bags. However, a load carrier can also be implemented by a so-called trolley, for example. A trolley is a type of carriage which is moved on a running rail and from which goods or loads are suspended. Platforms are often hooked onto the carriages so as to transport heavy piece goods, or piece goods that are difficult to handle, respectively, in a suspended state.

The load carriers circulate through the installation substantially in the clockwise direction. The profile of the path extends substantially along external peripheries of the installation. However, the load carriers within individual (functional) modules can also be directed into branches and circulate in the latter.

Publication EP 2789555 B1 discloses a device for providing in an order-oriented manner individual goods for a plurality of orders from a goods store, comprising at least one temporary store which for temporarily storing individual goods of at least one order is connected to a goods store, having in each case a collection region which for collecting the individual goods of the at least one completed order is connected to the at least one temporary store, and a separation region which for providing the individual goods of the at least one completed order in an order-oriented manner comprises a plurality of dispensing lines. The temporary store is in particular embodied as a revolving store. The individual goods temporarily stored in the temporary store are continuously stored in a revolving manner.

Publication WO 2017/027897 A1 describes an order-picking system for the order-picking of articles from storage containers into order containers, having a control computer for managing and processing order-picking instructions, and having at least one order-picking location according to the goods-to-person principle, where a number of articles predefined by the control computer are capable of being order-picked from the storage containers into conveying bags, and having an overhead conveyor technology for transporting the conveying bags, and having a packing location for packing the articles retrieved from the conveying bags and assigned to an order-picking instruction into the order container assigned to the order-picking instruction, wherein an order container conveyor technology for transporting order containers, in particular boxes, is provided at the order-picking location, and wherein the control computer for processing a first order-picking instruction is configured for defining the number of articles to be order-picked at the order-picking location in such a manner that the number of articles required for the order-picking of the first order-picking instruction are order-picked into the order container assigned to the first order-picking instruction, and further articles contained in the storage container are order-picked into at least one conveying bag for later order-picking of further order-picking instructions at the packing location.

In the case of all order-picking installations it is desirable to achieve an effective and rapid sorting and assembling of the desired goods by way of an ideally low complexity in terms of technical equipment and at a high throughput in such a manner that the goods associated to an order can be combined completely and faultlessly and be rendered ready for dispatch.

If a matrix sorting unit is used in the order-picking, this usually requires a high complexity in terms of technical equipment when a multiplicity of dispatch locations have to be supplied with the goods assemblies according to the order.

SUMMARY OF THE INVENTION

It is therefore an object of the invention to achieve an order-picking installation which despite a high throughput can be implemented by way of a reduced complexity in terms of technical equipment such that a matrix sorting unit used can either be embodied in a simpler manner or be entirely dispensed with.

A further object of the invention is to specify a method for operating such an order-picking installation.

These objects are achieved by an order-picking installation as claimed in claim 1, as well as by a method as claimed in claim 21.

The order-picking installation according to the invention for the order-picking of different goods that are capable of being transported in a suspended state, comprises at least one supply station having a plurality of supply locations which for supplying the goods to be order-picked to the order-picking installation are disposed in parallel, as well as at least one dispatch station having a plurality of dispatch locations which for dispensing the order-picked goods for dispatch are disposed in parallel, wherein at least one temporary store is provided for order-picking the goods between the supply station and the dispatch station.

Said order-picking installation is characterized in that the at least one temporary store has a dynamic store for temporarily storing the goods provided for the order-picking, and a standby store, downstream of the dynamic store, for storing goods which are retrieved from the dynamic store and thereby pre-sorted and which are disposed within a common continuous conveyor and are connected to each other by way of the common continuous conveyor.

The continuous conveyor is a conveyor by way of which the goods can be conveyed in a closed circuit, or circulation, respectively. Activatable or switchable turnouts herein can be provided at various locations of the continuous conveyor, said turnouts enabling a targeted introduction of new goods into the circuit, or an extraction of goods circulating in the circuit, respectively. The goods herein are subdivided into transport units which can in each case be moved and be added to the circuit, or be removed from the circuit, respectively. The goods circulating in the circuit and deposited in the dynamic store are present in a specific sequence which in most instances depends on the temporally staged retrieval of the goods from the goods store but does not correspond to the goods assemblies (batches) determined by the orders.

On account of pre-sorting the goods in the standby store, the goods are already combined in an assembly that corresponds to the orders such that a downstream matrix sorting unit is relieved of sorting work and can accordingly be of a smaller dimension, or be entirely dispensed with.

One embodiment of the order-picking installation according to the invention is characterized in that a matrix sorting unit for further sorting is disposed between the temporary store and the dispatch station. The use of such a matrix sorting unit is then desirable in particular when the goods of one order are to be present at the dispatch station in a specific sequence.

One other embodiment of the order-picking installation according to the invention is characterized in that the continuous conveyor is sub-divided into two regions, in that the dynamic store is disposed in one of the two regions, and the standby store is disposed in the other of the two regions, and in that the continuous conveyor is provided for transporting the goods from the dynamic store to the standby store. A compact and effective temporary store having a sorting function results on account thereof, said temporary store enabling a high throughput of goods.

One other embodiment of the order-picking installation according to the invention is characterized in that the continuous conveyor comprises a plurality of conveyor sections, and in that the dynamic store and the standby store are in each case formed by a plurality of storage sections which as branches depart from predefined conveyor sections of the continuous conveyor.

This configuration contributes toward the compact construction of the installation, and enables short connections between the storage sections and the storage portions of the temporary store.

In particular, the storage sections can comprise in each case one entry and one exit, and the storage sections by way of the entry can in each case be connected to a first conveyor section, and by way of the exit can in each case be connected to a second conveyor section.

The conveying directions of the first and the second conveyor section herein are preferably mutually opposed.

The storage sections can also be connected to the associated conveyor sections of the continuous conveyor at the entry side by way of an activatable egress turnout, and at the exit by way of an activatable access turnout.

The complexity in terms of technical equipment can be furthermore reduced in that the storage sections are in each case configured as gravity sections which comprise a gradient from the entry to the exit, and on which the conveyed goods by virtue of gravity move in a self-acting manner from the entry to the exit. A stopping mechanism which stops the downward movement of the goods is in this instance in each case provided at the exit of the storage sections. If a piece of goods is then retrieved from the storage section, said piece of goods is singularized and is introduced into the continuous conveyor by way of the respective access turnout.

For configuring the gravity sections, the first conveyor sections can run at a first height, and the second conveyor sections can run at a second height, wherein the first height is greater than the second height. The height differential herein has to be chosen such that the gradient created enables a reliable and sufficiently rapid movement of the goods on the gravitation section even in the case of a low weight of the goods.

Furthermore, the storage sections of the dynamic store and of the standby store can run so as to be mutually parallel, wherein the storage sections of the dynamic store comprise in each case identical first gradients, the storage sections of the standby store comprise in each case identical second gradients, and the first gradient and the second gradient are oriented so as to be mutually opposed. These features also increase the throughput and the compact construction of the installation.

In particular, the continuous conveyor herein in the transition from the first region to the second region can change from the second height to the first height, and in the transition from the second region to the first region can change from the second height to the first height.

The goods to be order-picked for temporary storage and pre-sorting between the two regions of the continuous conveyor by way of an infeed line can be capable of being fed into the continuous conveyor, and there by way of an outfeed line can also again be capable of being retrieved in a pre-sorted state from the standby store.

At least one return section having an associated egress turnout can also be provided at the exit of the dynamic store toward the standby store, goods in transit from the dynamic store to the standby store by way of said return section being able to be selectively conveyed from the second conveyor section back to the first conveyor section.

One other embodiment of the order-picking installation according to the invention is characterized in that the continuous conveyor comprises an overhead conveyor. The goods are transported in a suspended state on the overhead conveyor, this enables an increase in terms of the density of goods on the transport paths and on the storage sections.

In particular, the goods to be order-picked in the continuous conveyor can be transported in a suspended manner on individual carriages along a running rail, wherein the carriages in the continuous conveyor are moved by a driven conveyor chain which so as to be parallel with the running rail is guided in a dedicated rail and which releasably engages with the carriages. Suitable carriages and running rails are described and disclosed in detail, for example, in publication WO 2016/030275 A1. However, it is also conceivable for a conveyor chain to be disposed laterally as is shown in publication WO 2016/030273 A1.

For transporting the goods to be order-picked, in particular when the goods to be order-picked are largely fashion articles, transport bags can be capable of being fixedly attached in a suspended manner to the carriages, and/or clothes hangers can be capable of being releasably attached in a suspended manner to the carriages.

A further increase in terms of the throughput results when a plurality of temporary stores operating in parallel are provided in the order-picking installation.

If carriages on running rails are used for transporting the goods, a return of the carriages not impinged with goods from the dispatch station to the supply station can be provided, so as to achieve a closed circuit of the transport means.

At least one empties store for the carriages not impinged with goods can in particular be provided in the return herein.

A controller can be provided for the operation of the order-picking installation, said controller assembling the respective goods per order as stipulated by the incoming orders, and directing said goods in the assembled form to the dispatch locations in the dispatch stations.

The method according to the invention for operating an order-picking insulation according to the invention is characterized in that the goods associated with a plurality of orders are first stored in the dynamic store of the at least one temporary store, then pre-sorted into the standby store, and subsequently transferred to the individual dispatch locations in the dispatch station such that all goods associated with one order are present at the respective dispatch location.

According to one embodiment of the invention according to the invention, the goods are pre-sorted when in transit from the dynamic store to the standby store.

The goods herein which for pre-sorting emanate from the dynamic store can be selectively returned to the dynamic store or conveyed onward to the standby store.

In particular, the selective returning of the goods to the dynamic store can take place by way of at least one return section which by way of a controllable egress turnout is connected to the continuous conveyor.

BRIEF DESCRIPTION OF SEVERAL VIEWS OF THE DRAWINGS

FIG. 8 shows an exemplary embodiment of a complete order-picking installation according to the invention that is comparable to that of FIG. 7, two empties stores for the empty transporting means being provided therein;

FIG. 9a shows one view of a temporary store according to one exemplary embodiment of the invention, said temporary store operating by way of gravity sections as storage sections;

FIG. 9b shows another view of the temporary store of FIG. 9a;

FIG. 9c shows another view of the temporary store of FIG. 9a;

FIG. 9d shows another view of the temporary store of FIG. 9a;

FIG. 9e shows another view of the temporary store of FIG. 9a;

FIG. 9f shows another view of the temporary store of FIG. 9a;

FIG. 9g shows another view of the temporary store of FIG. 9a;

DETAILED DESCRIPTION OF THE INVENTION

Figure 1:
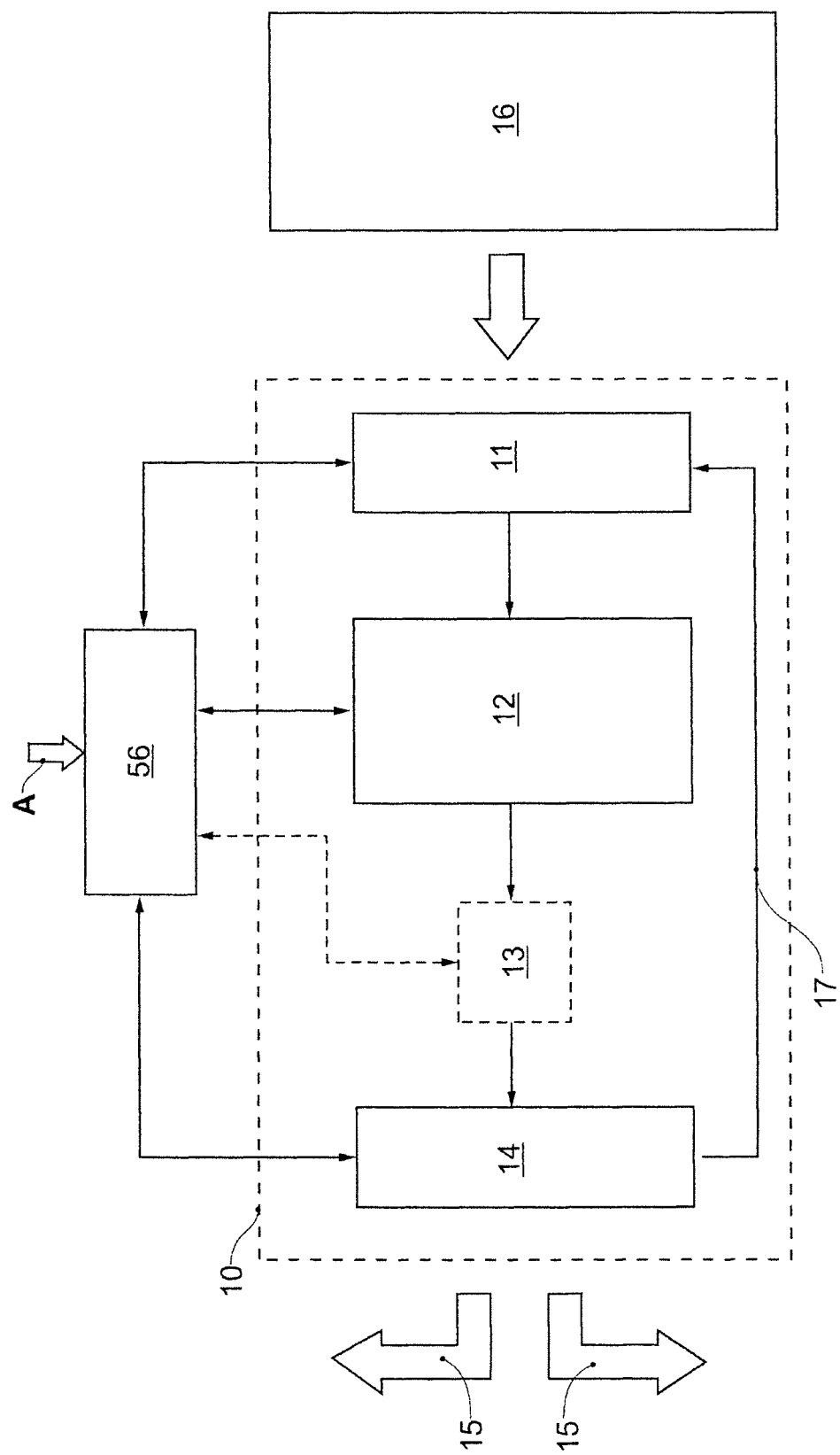
FIG. 1 is a schematic illustration shows an order-picking installation which is suitable for implementing the present invention.

An order-picking installation 10 which is suitable for implementing the present invention is reproduced in a schematic illustration in FIG. 1. The order-picking installation 10 usually receives the goods to be order-picked from a goods store 16 which can be configured as a high bay warehouse, for example. Other types of stores are however also conceivable.

When respective orders A are issued, the goods required in the orders are retrieved from the goods store 16 and by way of a supply station 11 are introduced into the order-picking installation 10. A plurality of supply locations (35, 36 in FIG. 7) are usually disposed in parallel in the supply station 11, the goods emanating from the goods store 16 at said supply locations being detected in terms of data technology (by means of RFID, barcode, or the like) and being assigned and fed to the transport means (for example the transport bag 55 in FIG. 12) circulating within the order-picking installation. The recorded data is transferred to a central controller 56 into which the items of information pertaining to the orders A are input and which controls the operation of the order-picking installation 10 and performs the order-picking.

The goods retrieved from the goods store 16 are conveyed from the supply station 11 onward into a temporary store 12 where said goods for the further processing of the orders are temporarily stored. In order for the orders A to be processed, the goods associated with each order have to now be assembled so as to form a group (batch) so that said goods can be packed in the dispatch station 14 and then rendered ready for delivery. The dispatch station 14 usually comprises a plurality of individual dispatch locations (40 in FIG. 7) that operate in parallel. The assembling of the goods is performed such that one order A can in each case be completed at one dispatch location. To this end, in particular when the goods of one order are to be present in a specific sequence, a matrix sorting unit 13 can be used (plotted in dashed lines as an option in FIGS. 1 and 2), the goods from the temporary store 12 being fed to said matrix sorting unit 13 which directs the goods in groups onward to the dispatch locations in the dispatch station 14. The procedures which take place in the temporary store 12, optionally in the matrix sorting unit 13, and in the dispatch station 14 and which in particular require the activation of a multiplicity of turnouts, are controlled by the controller 56 as stipulated by the orders A. The order-picked and packed goods then move from the dispatch station 14 to the dispatch 15 so as to be delivered to the respective customers.

Should the goods to be order-picked and stored in the goods store 16 be various goods such as, for example, small appliances, domestic appliances, pieces of apparel, shirts, laundry, cosmetics, etc., it is expedient for the goods within the order-picking installation to be transported in various ways, so as to be adapted to the goods. For example, clothes hangers can thus be provided for transporting jackets, coats, shirts, or dresses, the goods being transported through the order-picking installation so as to be suspended on said clothes hangers, while other goods are moved through the order-picking installation in transport bags suitable for this purpose.

Figure 2:
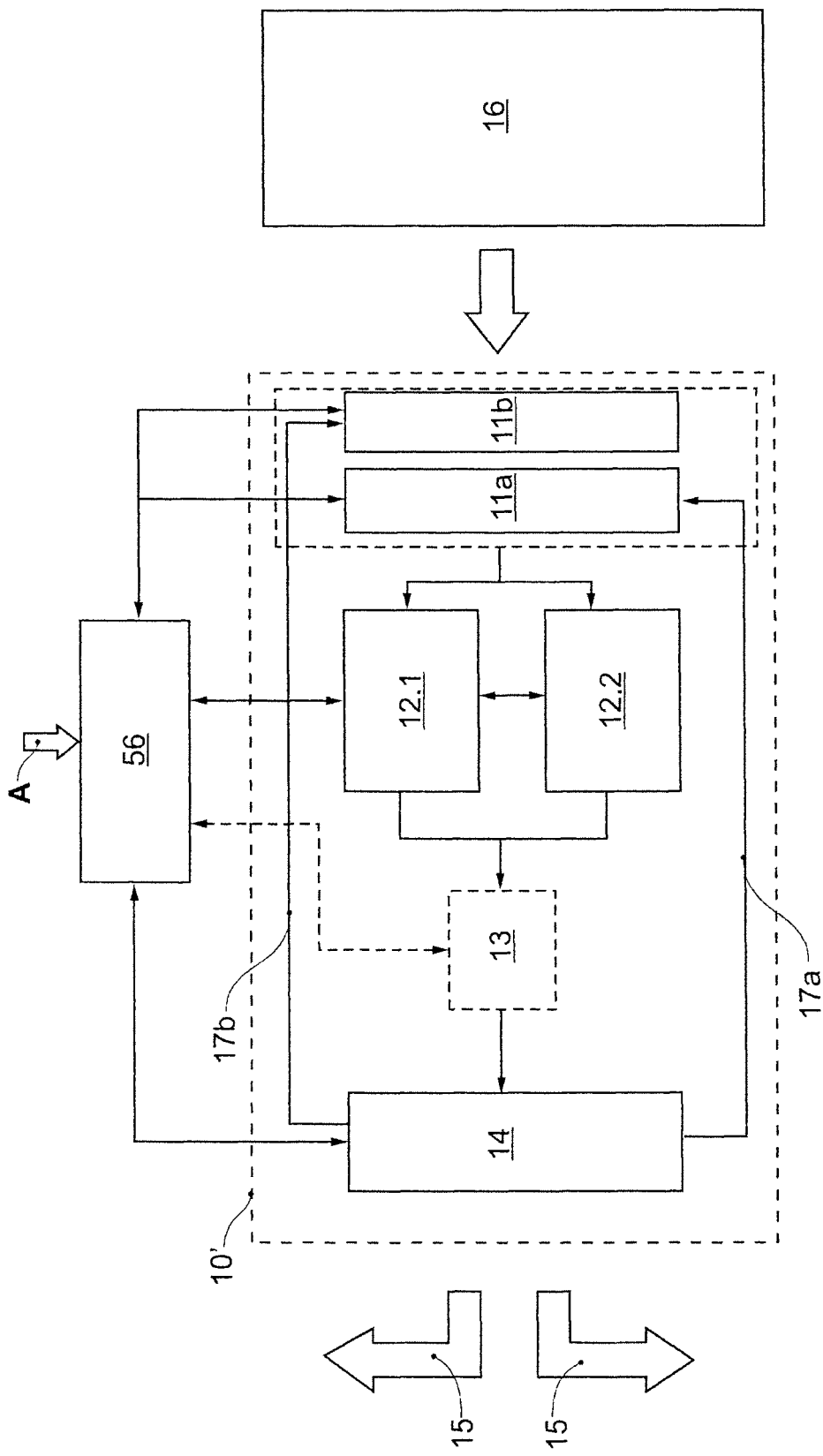
FIG. 2 shows an order-picking installation which is comparable to that of FIG. 1 and which is conceived for different goods to be transported and is equipped with a plurality of temporary stores operating in parallel.

The fundamental construction of the order-picking installation changes in such a case, as is illustrated in FIG. 2. The order-picking installation 10 of FIG. 2 differs from the order-picking installation 10 of FIG. 1 inter alia in that two dissimilar supply stations 11a and 11b are present, one of which being provided for supplying goods suspended on clothes hangers, and the other being provided for loading transport bags. The goods processed in the two supply stations 11a and 11b are brought together again at the exit of the supply stations, and then are collectively further processed, initially in an arbitrary sequence. Said further processing can take place in a single temporary store, or else can be carried out in two temporary stores 12.1 and 12.2 which operate in parallel, as is shown in FIG. 2, said two temporary stores at the exit optionally again feeding a common matrix sorting unit 13. In order for the throughput of goods to be increased, a plurality of complete order-picking lines that operate in parallel can also however be readily provided in the order-picking installation.

When the goods are transported, for example, in a suspended state on individual carriages on rails through the order-picking installation (transport unit 41 in FIG. 9), the (empty) carriages after the retrieval of the goods in the dispatch station 14 for renewed loading have to be returned back again back to the dispatch station 11, or to the dispatch stations 11a and 11b. To this end, a return 17 is provided in the order-picking installation 10 of FIG. 1. In the order-picking insulation 10' of FIG. 2, two returns 17a and 17b are used in a manner corresponding to the different transport modes, said two returns 17a and 17b being assigned to the dissimilar dispatch stations 11a and 11b.

In order that the matrix sorting unit 13 which is complex in terms of technical equipment can be embodied so as to be smaller than usual, or entirely dispensed with even in the case of a multiplicity of dispatch locations, according to the invention a special pre-sorting of the goods is to be performed already in the temporary store 12. A special construction of the temporary store 12, or 12.1 and 12.2, respectively, serves to this end, as will be explained hereunder.

Figure 3:
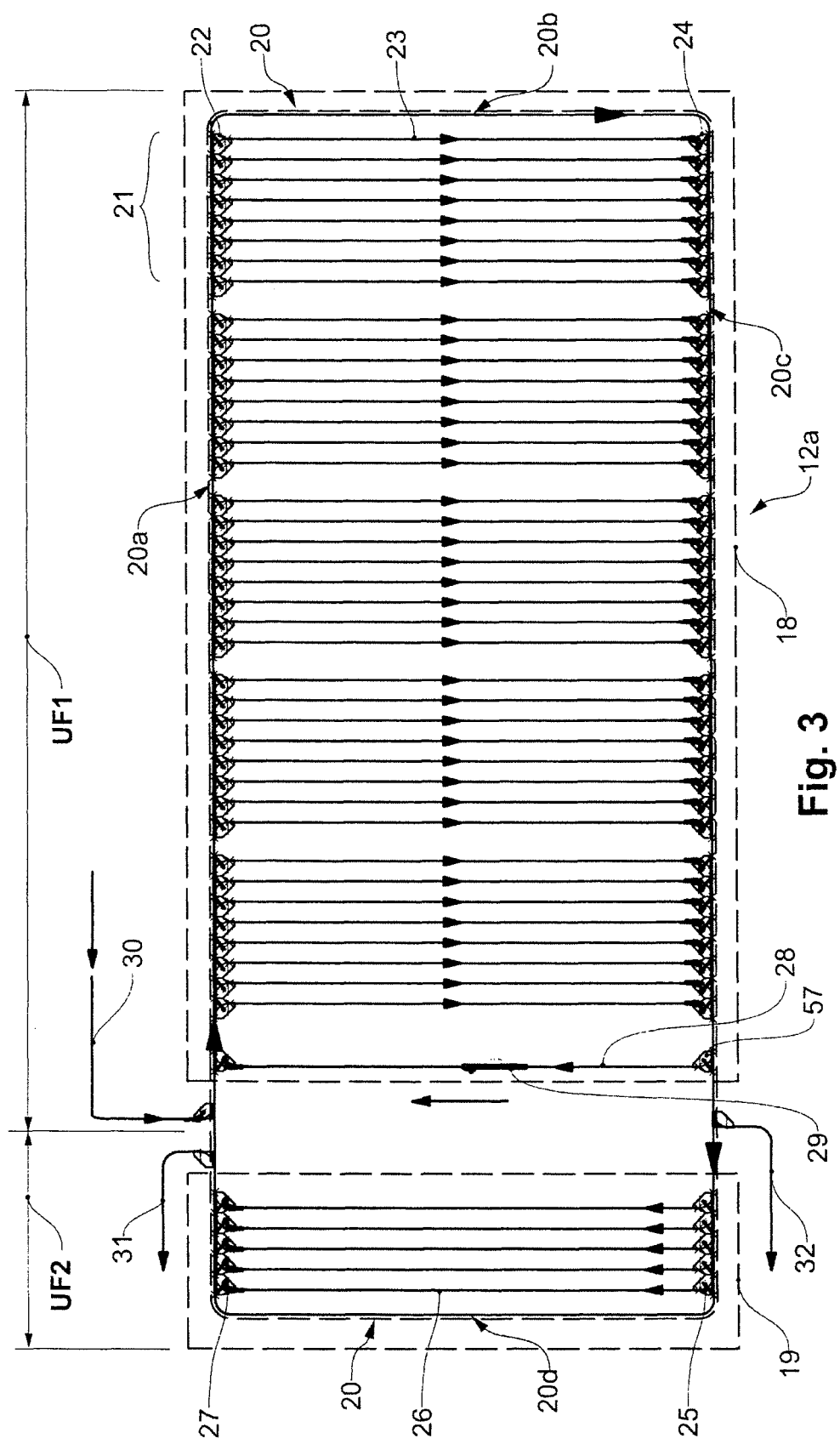
FIG. 3 shows a first exemplary embodiment for a temporary store according to the invention, having a return section between the dynamic store and the preliminary store.

An exemplary embodiment of such a special construction is reproduced in FIG. 3. The temporary store 12a of FIG. 3 comprises a continuous conveyor 20 which in the example illustrated comprises a (substantially horizontal) rectangular basic shape, having two opposite long sides (conveyor sections 20a and 20c) and two opposite short sides (conveyor sections 20b and 20d). As is identified by the plotted arrows, the goods conveyed by the continuous conveyor 20 move about the rectangle in the clockwise manner on the conveyor sections 20a-d.

The rectangular basic shape of the continuous conveyor 20 is now subdivided into a first region UF1 (right) and a second region UF2 (left). A dynamic store (dynamic buffer) 18 which contains a multiplicity of storage sections 23 which are combined in a total of five storage portions 21 having in each case eight parallel storage sections is disposed in a first region UF1 (framed by a dashed rectangle in FIG. 3). The storage sections 23 run as branches which depart orthogonally between the conveyor section 20a and the conveyor section 20c of the continuous conveyor 20. Each storage section 23 has an entry (at the top in FIG. 3) and an exit (at the bottom in FIG. 3) such that the goods can be transported on said storage section 23 in the indicated direction of the arrow (from top to bottom).

An activatable egress turnout 22 is disposed at the entry of each storage section 23, said egress turnout 22 when activated ensuring that goods conveyed on the conveyor section 20a are deflected from the conveyor section 20a to the storage section 23. An activatable access turnout 24 is disposed at the exit of each storage section 23, said access turnout 24 when activated ensuring that a piece of goods is deflected from the storage section 23 to the conveyor section 20c of the continuous conveyor 20. To this end, it is furthermore necessary for the piece of goods on the storage section 23 to be singularized ahead of the access turnout 24, and for said piece of goods to be conveyed out of the storage section 23 by way of the access turnout 24.

As standby store (pre-buffer) 19 which in one group contains a total of five parallel storage sections 26 is disposed in the second region UF2 (likewise framed by a dashed rectangle in FIG. 3). The storage sections 26 run as branches which depart orthogonally between the conveyor section 20c and the conveyor section 20a of the continuous conveyor 20. Each storage section 26 has an entry (at the bottom in FIG. 3) and an exit (at the top in FIG. 3) such that the goods on said storage section 26 are transported in the indicated direction of the arrow (from bottom to top). The transport direction on the storage sections 26 is thus countered to the transport direction on the storage sections 23.

An activatable egress turnout 25 is disposed at the entry of each storage section 26, said egress turnout 25 when activated ensuring that goods conveyed on the conveyor section 20c are deflected from the conveyor section 20c to the storage section 26. An activatable access turnout 27 is disposed at the exit of each storage section 26, said access turnout 27 when activated ensuring that a piece of goods is deflected from the storage section 26 to the conveyor section 20a of the continuous conveyor 20. To this end, it is likewise necessary for the piece of goods on the storage section 26 to be singularized ahead of the access turnout 27 and for said piece of goods to be conveyed out of the storage section 26 by way of the access turnout 27.

The dynamic store 18 and the standby store 19 in terms of conveyor technology are thus closely connected to one another by way of the continuous conveyor 20. An intermediate space in which a plurality of conveyor lines 30, 31, 32 lead away from the continuous conveyor 20, or toward the continuous conveyor 20, respectively, is kept vacant between the dynamic store 18 and the standby store 19. Goods emanating from the supply station 11 are introduced into the continuous conveyor 20 by way of an infeed line 30 and a corresponding access turnout, and are then temporarily stored in the dynamic store 18 and the storage sections 23 thereof. On the other hand, the pre-sorted goods stored in the standby store 19 are retrieved by the continuous conveyor 20 by way of an outfeed line 31 and by way of an egress turnout and directed onward to the matrix sorting unit 13 (or directly to the dispatch station 14). When using carrier bags, a further outfeed line 32 having a corresponding egress turnout can be used for transporting empty carrier bags to the dispatch station 14.

The storage sections 23 and 26 in the exemplary embodiment illustrated are configured as passive gravity sections which comprise a gradient from the entry toward the exit, and on which the conveyed goods (for example suspended on the previously mentioned carriages) by virtue of gravity move in a self-acting manner (that is to say without the intervention of a conveyor chain or the like) from the entry to the exit. To this end, it is necessary for the conveyor section 20a in the first region UF1 of the continuous conveyor 20 to lie at a higher level than the conveyor section 20c. Conversely, the conveyor section 20c in the second region UF2 of the continuous conveyor 20 has to lie at a higher level than the conveyor section 20a, so as to generate an opposing gradient. In order for the closed circuit to be guaranteed, the conveyor section 20a in the transition from the second region UF2 to the first region UF1 has to comprise an ascending section (42a, c in FIG. 9) just as the conveyor section 20c in the transition from the first region UF1 to the second region UF2. Accordingly, a respective descending section (42b,d in FIG. 9) has to be provided in the conveyor sections 20b and 20c. These peculiarities will be discussed once again in the context of FIGS. 9 and 10.

In order for a closed circuit to be enabled within the first region UF1, or of the dynamic store 18, respectively, a return section 28 is disposed on that side of the dynamic store 18 that is adjacent to the standby store 19, said return section 28 having a corresponding egress turnout 57 at the entry and an access turnout at the exit, and the sending conveyor 29 being inserted for overcoming the height differential in said return section 28. With the aid of the return section 28 and of a corresponding actuation of the associated egress turnout 57 it is possible for the standby store 19 to be filled with goods pre-sorted according to the order. To this end, goods from the dynamic store 18 are moved in (an unsorted) sequence to the conveyor section 20c and by way of the continuous conveyor 20 conveyed onward in the direction of the standby store 19. By way of suitably actuating the egress turnout 57 of the return section 28, those of the retrieved goods which according to the order are required in the dispatch station 14 are admitted to the standby store 19 at the egress turnout 57. The other (not required) goods by way of the return section 28 are directed and conveyed back again to the dynamic store 18. The admitted goods in the standby store 19 can then be suitably grouped in the storage sections 26 and finally be conveyed to the dispatch station 14 by way of the outfeed line 31.

Figure 4:
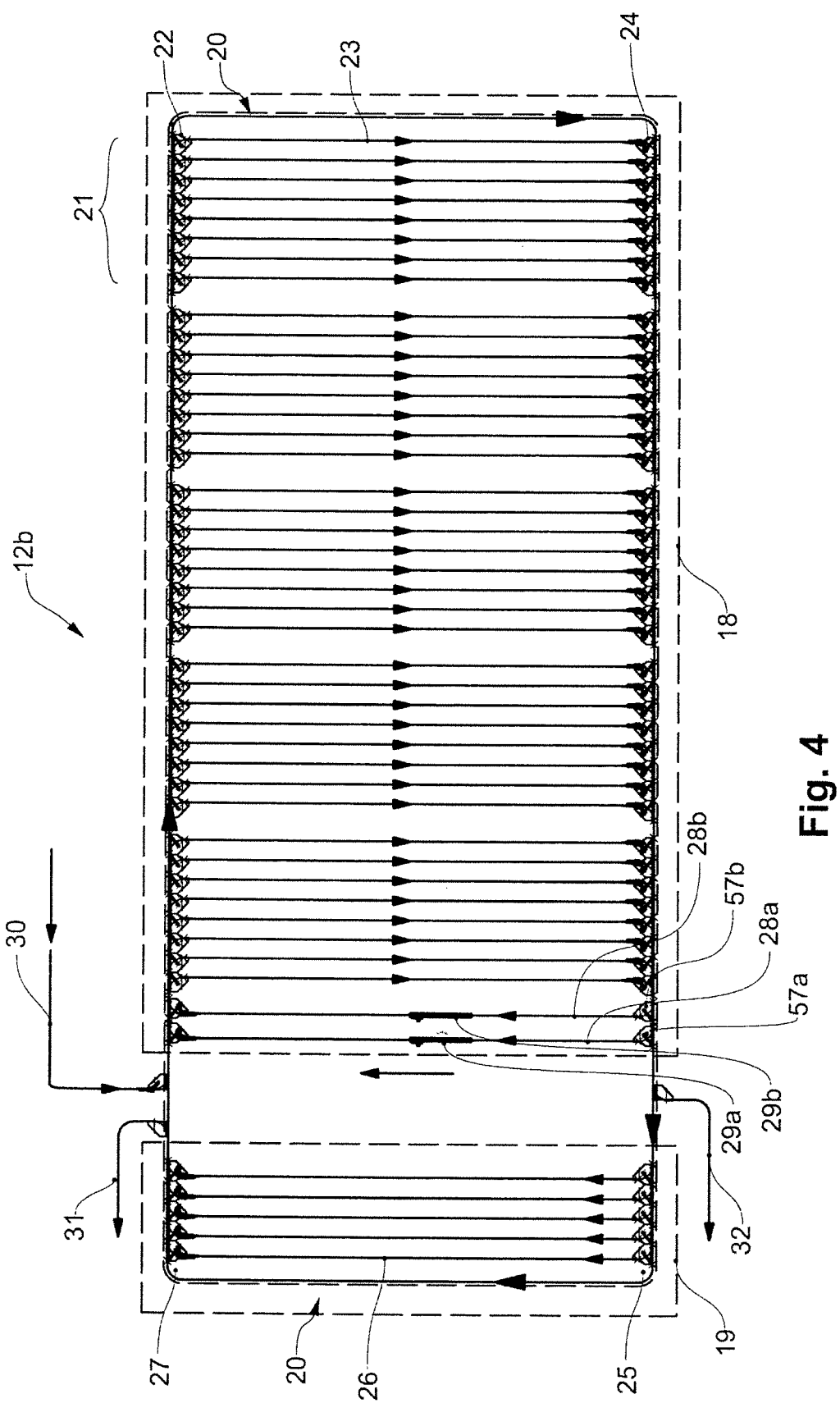
FIG. 4 shows a second exemplary embodiment for a temporary store according to the invention, having two parallel return sections between the dynamic store and the preliminary store.

FIG. 4 shows an exemplary embodiment of a temporary store according to the invention that is slightly modified in comparison to FIG. 3. The difference in the case of the temporary store 12b lies in that, instead of the one return section 28, two parallel return sections 28a and 28b having corresponding ascending conveyors 29a and 29b and egress turnouts 57a and 57b are now provided, said two parallel return sections 28a and 28b further facilitating or exhilarating, respectively, a re-arranging or re-sorting, respectively, of goods in transit from the dynamic store 18 to the standby store 19.

Figure 5:
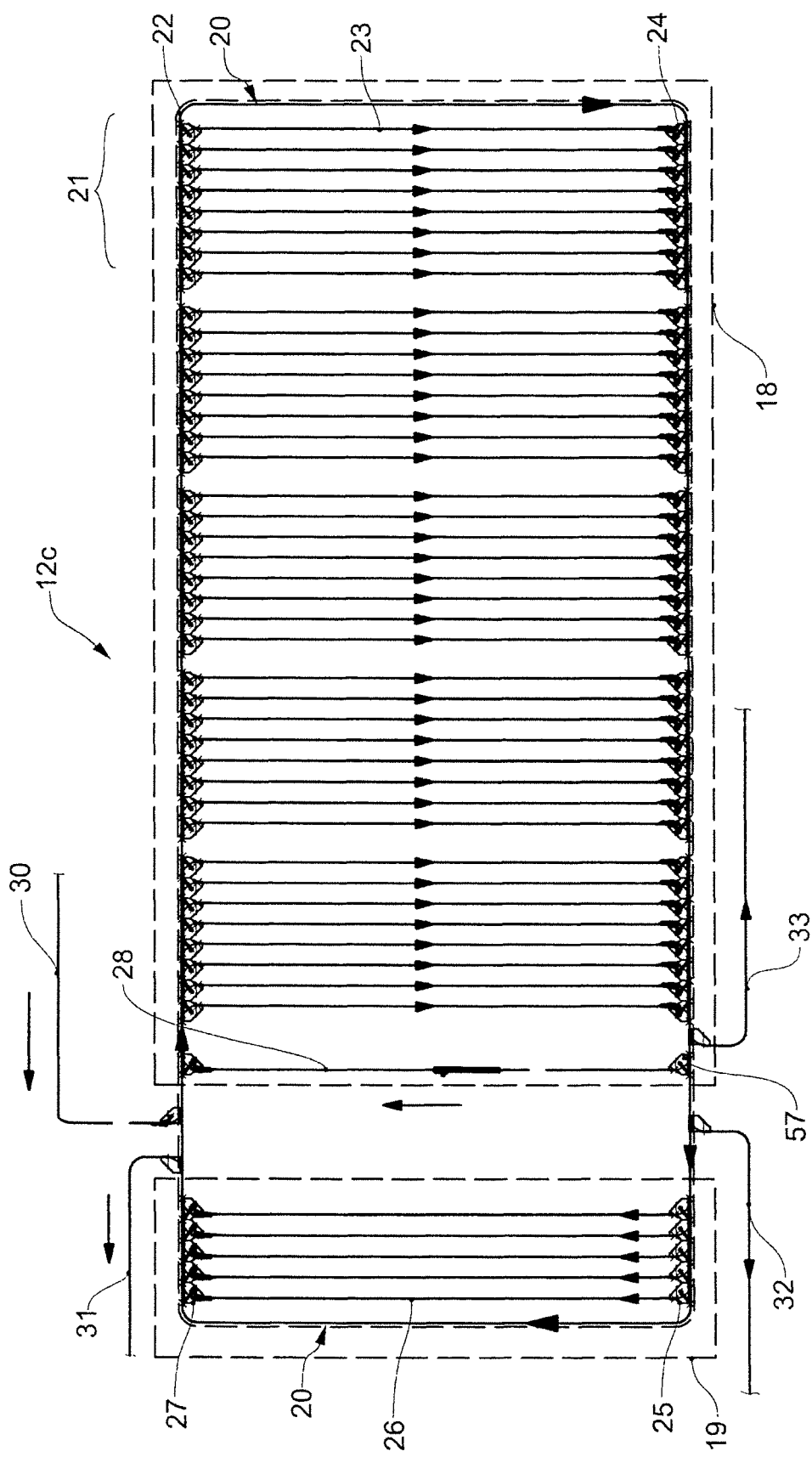
FIG. 5 shows an exemplary embodiment for a temporary store according to the invention that is comparable to that of FIG. 3, having an additional return line ahead of the return section between the dynamic store and the preliminary store.

FIG. 5 shows an exemplary embodiment of a temporary store according to the invention that is slightly modified in comparison to FIG. 3. The difference in the case of the temporary store 12c lies in that a return line 33 by way of which goods can be conveyed from the continuous conveyor 20 back to the dispatch station 11 when required branches off from the continuous conveyor 20 ahead of the return section 28.

Figure 6:
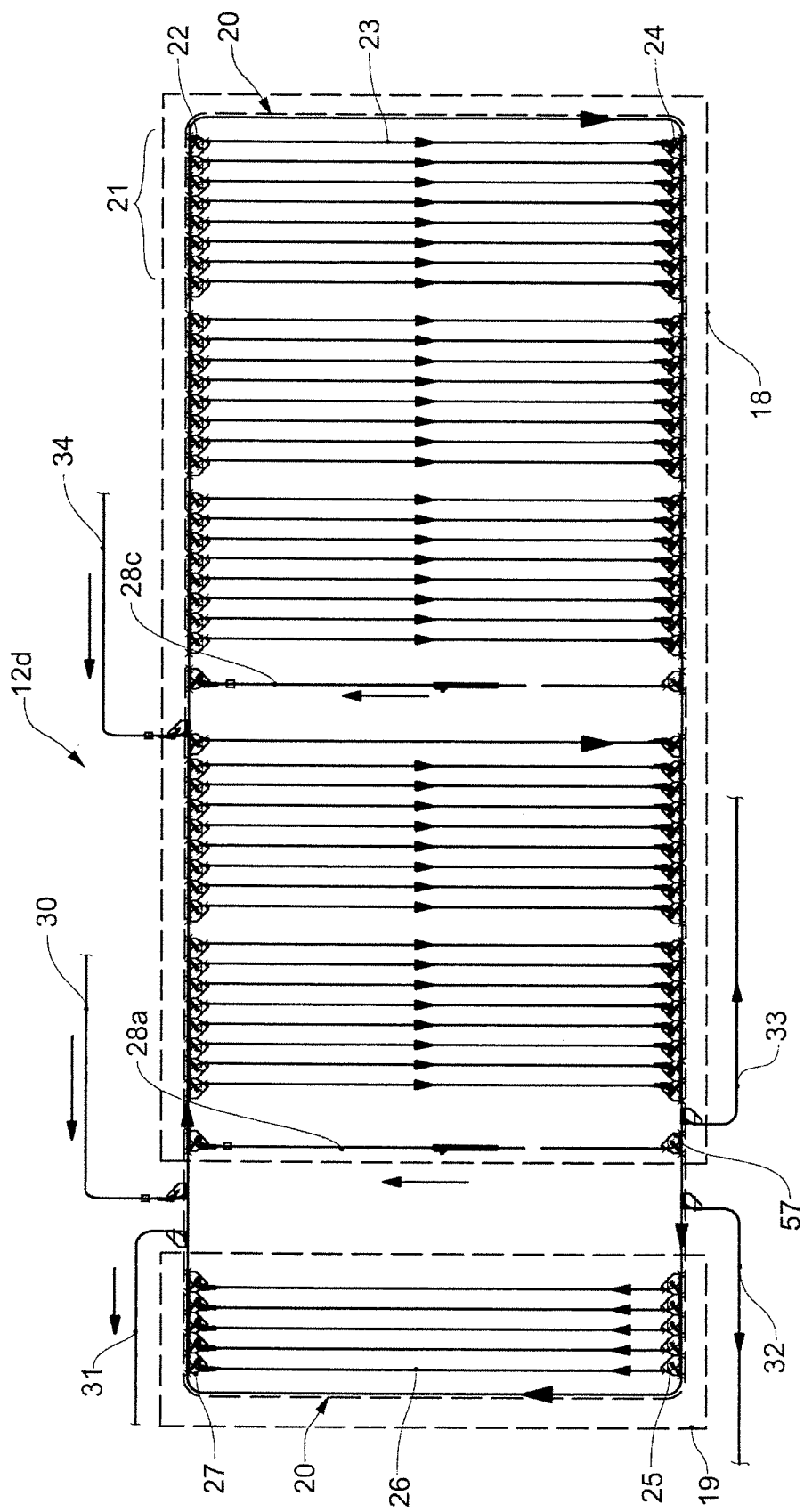
FIG. 6 shows an exemplary embodiment for a temporary store according to the invention that is comparable to that of FIG. 5, wherein the dynamic store is subdivided and comprises an additional infeed line and return section between the parts of the dynamic store.

FIG. 6 shows an exemplary embodiment of a temporary store according to the invention that is slightly modified in comparison to FIG. 3. The difference in the case of the temporary store 12d lies in that an additional return section 28c is installed in the central part of the dynamic store 18, and a further infeed line 34 is provided at this location. The dynamic store 18 is thus subdivided into two sub-stores which are capable of being separately filled and from which goods can be separately re-arranged.

Figure 7:
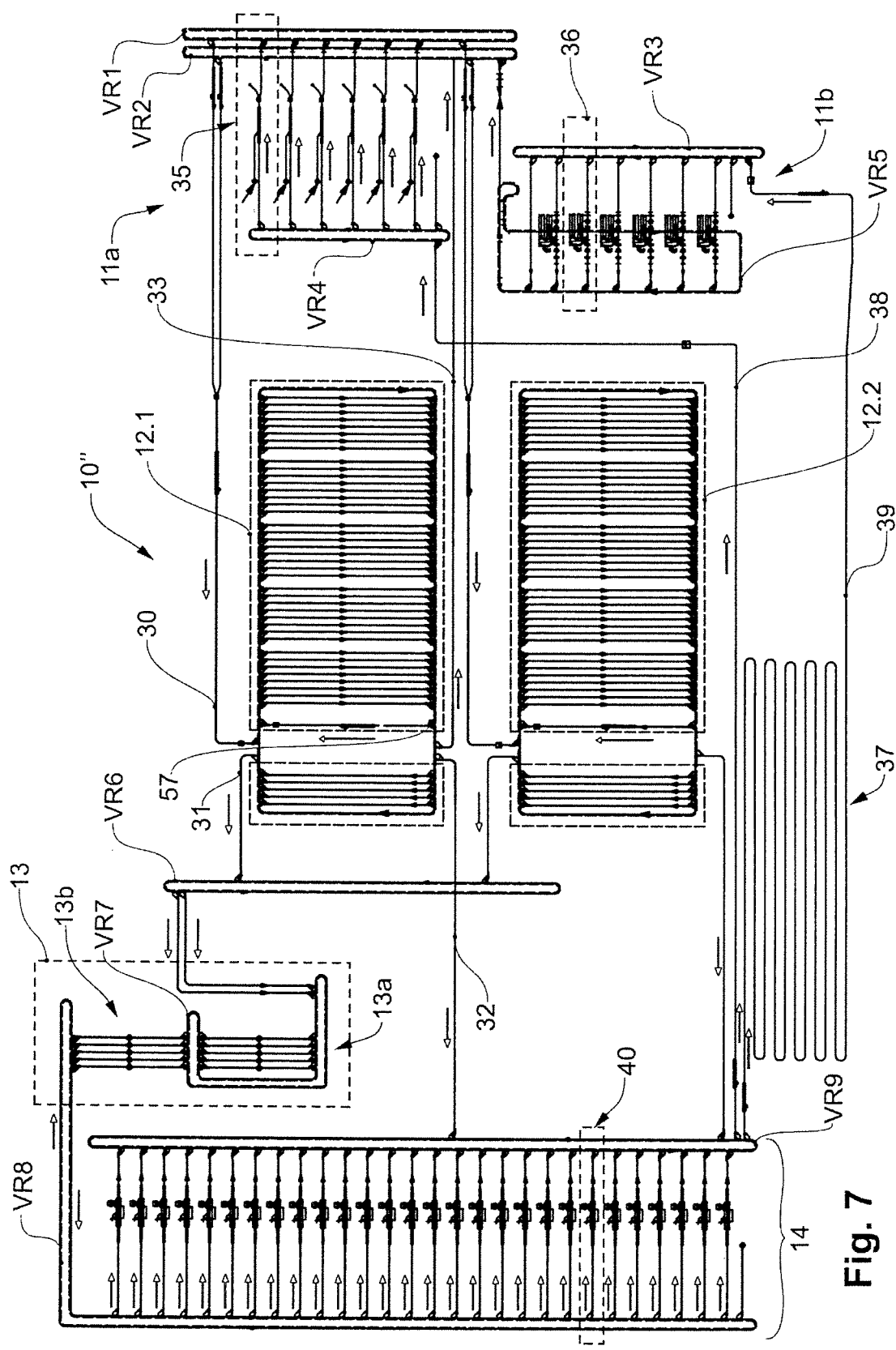
FIG. 7 shows an exemplary embodiment of a complete order-picking installation according to the invention which is suitable for transporting goods in suspended bags and by means of clothes hangers, and in the return of the empty transporting means comprises an empties store.

An exemplary embodiment of an order-picking installation which shows further details is shown in FIG. 7. The order-picking installation 10″, which can be conceived for throughput rates in the magnitude of several thousand transport units, or goods, respectively, per hour, for example, comprises a first supply station 11a having a total of six supply locations 35 which operate in parallel and where in each case clothing suspended on clothes hangers can be supplied for transport within the order-picking installation (garment on hanger—GOH). A second supply station 11b having likewise six supply locations 36 serves for filling goods which cannot be suspended from a clothes hanger into transport bags.

Two temporary stores operating in parallel 12.1 and 12.2 are provided for temporary storing, each of said temporary stores 12.1 and 12.2 comprising an internal construction as is shown in an exemplary manner in FIGS. 3 to 6. In this case, a matrix sorting unit 13 having two sorting stages 13a and 13b lying behind one another is disposed behind the temporary stores 12.1 and 12.2. The goods from the exit of the matrix sorting unit 13 make their way into the dispatch station 14 having a total of 28 individual dispatch locations 40 operating in parallel. The transportation of the goods between the individual parts of the installation takes place by way of distribution circuits VR1 to VR9, wherein the distribution circuit VR8 moves the goods pre-sorted according to the order to the individual dispatch locations 40, and the distribution circuit VR9 collects the empty transport means for returning to the respective supply stations 11a and 11b by way of the empties return lines 38 and 39. An empties store 37 in which the empty transport bags can be collected and temporarily stored is inserted in the empties return line 39 for the empty transport bags. The distribution circuit VR6 collects the pre-sorted goods from the two temporary stores 12.1 and 12.2 and transfers said pre-sorted goods to the matrix sorting unit 13. It can be seen that the matrix sorting unit 13 having in each case five sections in the two sorting stages 13a and 13b because of the pre-sorting in the temporary stores 12.1 and 12.2 can be embodied so as to be very small.

The distribution circuit VR7 connects the two sorting stages 13a and 13b to one another. The distribution circuit VR4 distributes the returned empty transport means (without the piece of goods suspended from clothes hangers) to the individual supply locations 35 of the supply station 11a, while the distribution circuit VR3 performs a corresponding distribution of the empty transport bags to the supply locations 36 of the supply station 11b. The transport means filled with goods for inputting into the temporary stores 12.1 and 12.2 are collected by means of the distribution circuits VR1, VR2, and VR5.

The goods associated with a plurality of orders in such an order-picking installation 10‴ are first stored so as to be in a largely order less in the dynamic store of the temporary stores 12.1 and 12.2, then pre-sorted by means of the standby store, and subsequently by way of the matrix sorting unit 13 transferred to the individual dispatch locations 40 in the dispatch station 14 in such a manner that all goods associated with one order are present at the respective dispatch location 40 in a predefined sequence. The matrix sorting unit can also be entirely dispensed with in particular when a predetermined sequence is not required (for example in the case of an order from an end user of the goods). The pre-sorting with the aid of the continuous conveyor 20 takes place within the temporary stores 12.1 and 12.2 by interchanging the goods in a targeted manner between the dynamic store 18 and the standby store 19 while incorporating the return sections 28, or 28a-c, respectively.

FIG. 8 shows an exemplary embodiment compatible to that of FIG. 7, having an order-picking installation 10‴ which differs from the order-picking installation 10″ only in that an empties store 37' likewise is provided in the empties return line 38 for the empty transport means (without the piece of goods suspended from clothes hangers).

Figure 10:
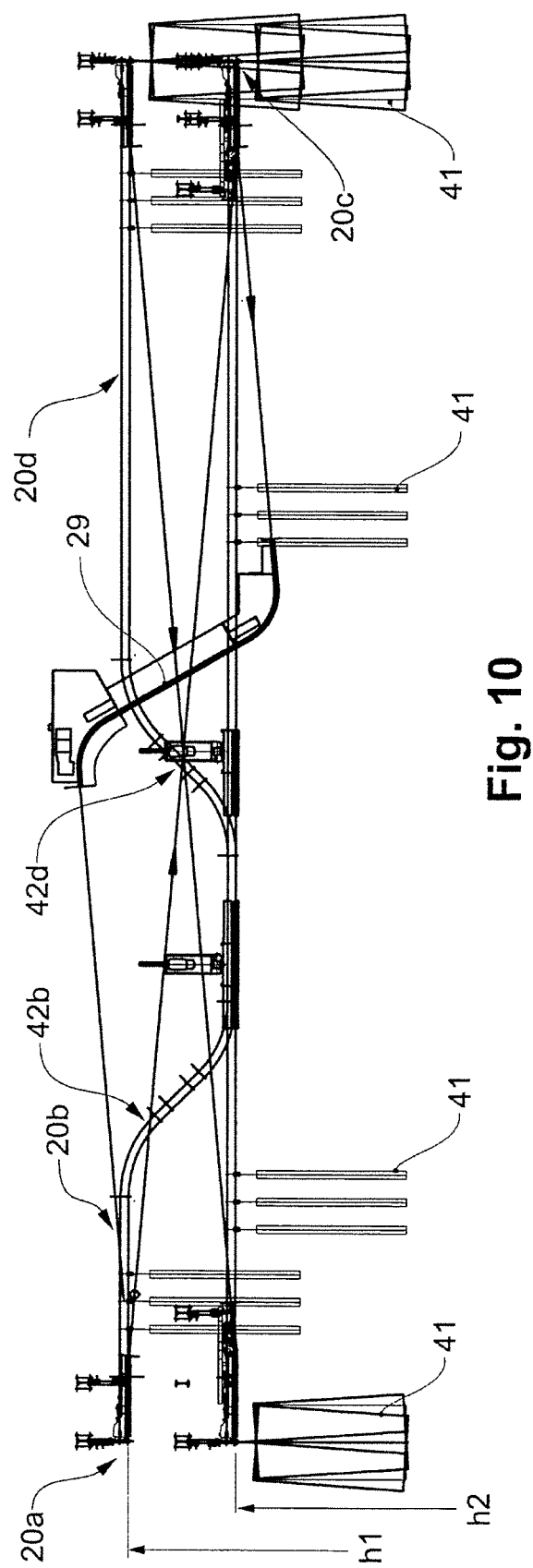
FIG. 10 is an enlarged illustration of FIG. 9(a)

FIGS. 9 and 10 in different sub-figures show different views of a temporary store of the type shown in FIGS. 3 to 6, which operates with gravity sections as storage sections, as has already been mentioned above. In the case of the temporary store 12e illustrated in FIG. 9, this leads to a height profile of the continuous conveyor 20 which changes between two dissimilar heights h1 and h2, as can be seen in FIG. 9(d) and in the lateral view according to FIG. 9(a) illustrated in an enlarged manner in FIG. 10. As is shown in the sub-FIG. 9(e), ascending sections 42b and 42d are installed for the change in height in the short lateral conveyor sections 20b and 20d of the continuous conveyor 20, while ascending sections 42a and 42c are installed in the long conveyor sections 20a and 20c between the dynamic store 18 and the standby store 19. Sub-FIGS. 9(c) and 9(f) show the (linear) gradient of the storage sections 23 and 26, respectively, while sub-FIG. 9(b) shows the return section 28 having the (required) ascending conveyor 29.

Figure 11:
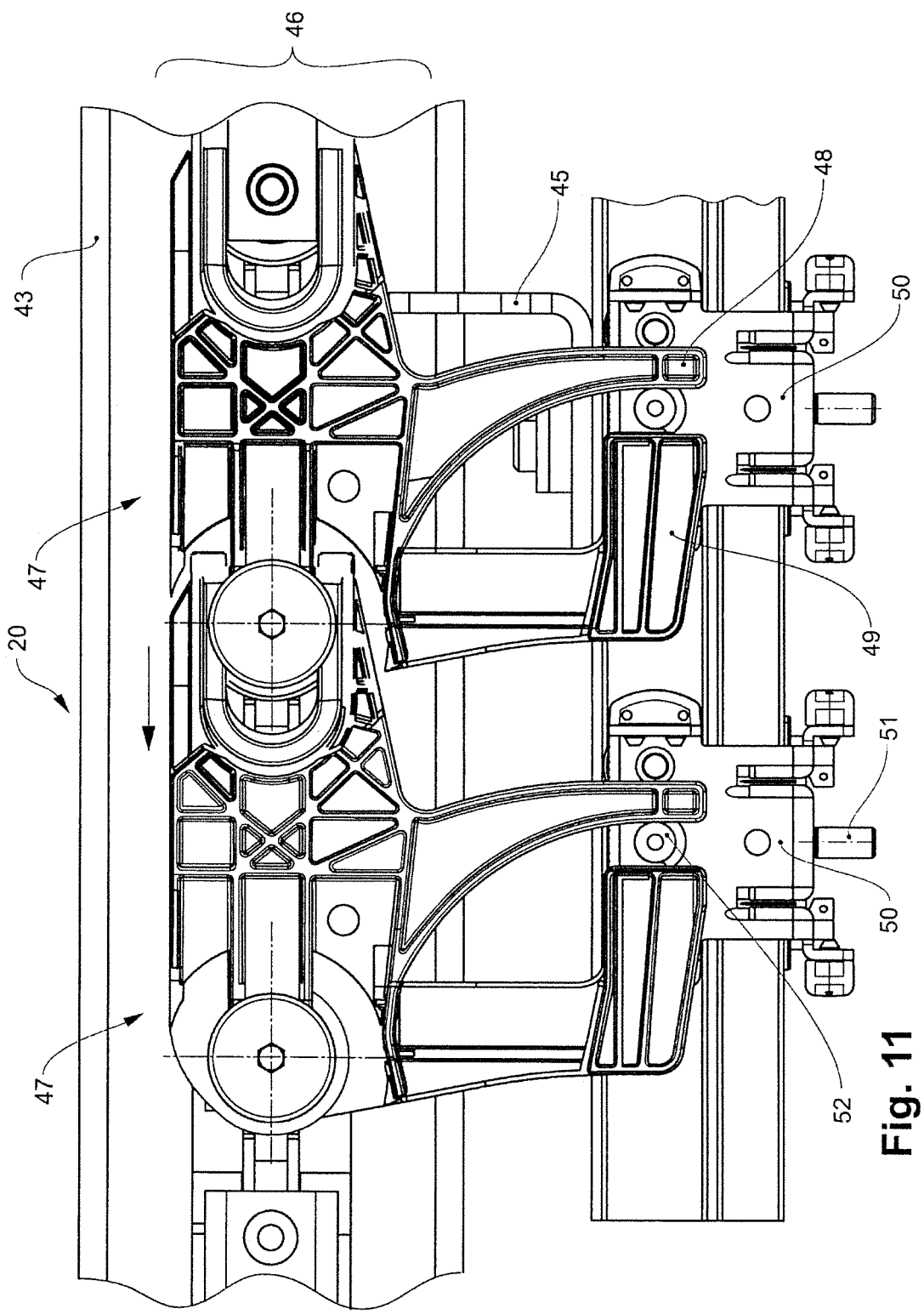
FIG. 11 shows a fragment of an exemplary embodiment of a continuous conveyor such as can be used in the temporary store of the invention.

FIG. 11 shows a fragment of an exemplary embodiment of a continuous conveyor such as can be used in the temporary store 12, or 12.1, 12.2, of 12a-c, respectively. The continuous conveyor 20 comprises a conveyor chain 46 which by way of the chain links 47 thereof in the running direction, or conveying direction, respectively, marked by an arrow is guided in a rail. A running rail 44 in which individual carriages 50 are mounted so as to be movable in the running direction is held so as to be parallel below the rail 43 of the conveyor chain 46 by means of support elements 45. The running rail 44 having the carriages 50 is also part of the storage sections 23 and 26 in the temporary stores. The chain links 47 of the conveyor chain 46 by way of entrainment elements 48 and 49 that project downward and by way of a pin-shaped engagement element 52 on the carriage 50 are in engagement with the carriage 50 such that a conveying movement of the conveyor chain 46 causes a corresponding movement of the engaged carriages 50. A connection element 51 by means of which a transport bag or a clothes hanger, for example, can be fastened on the suspended state on the carriage 50 is provided on each of the carriages 50.

Figure 12:
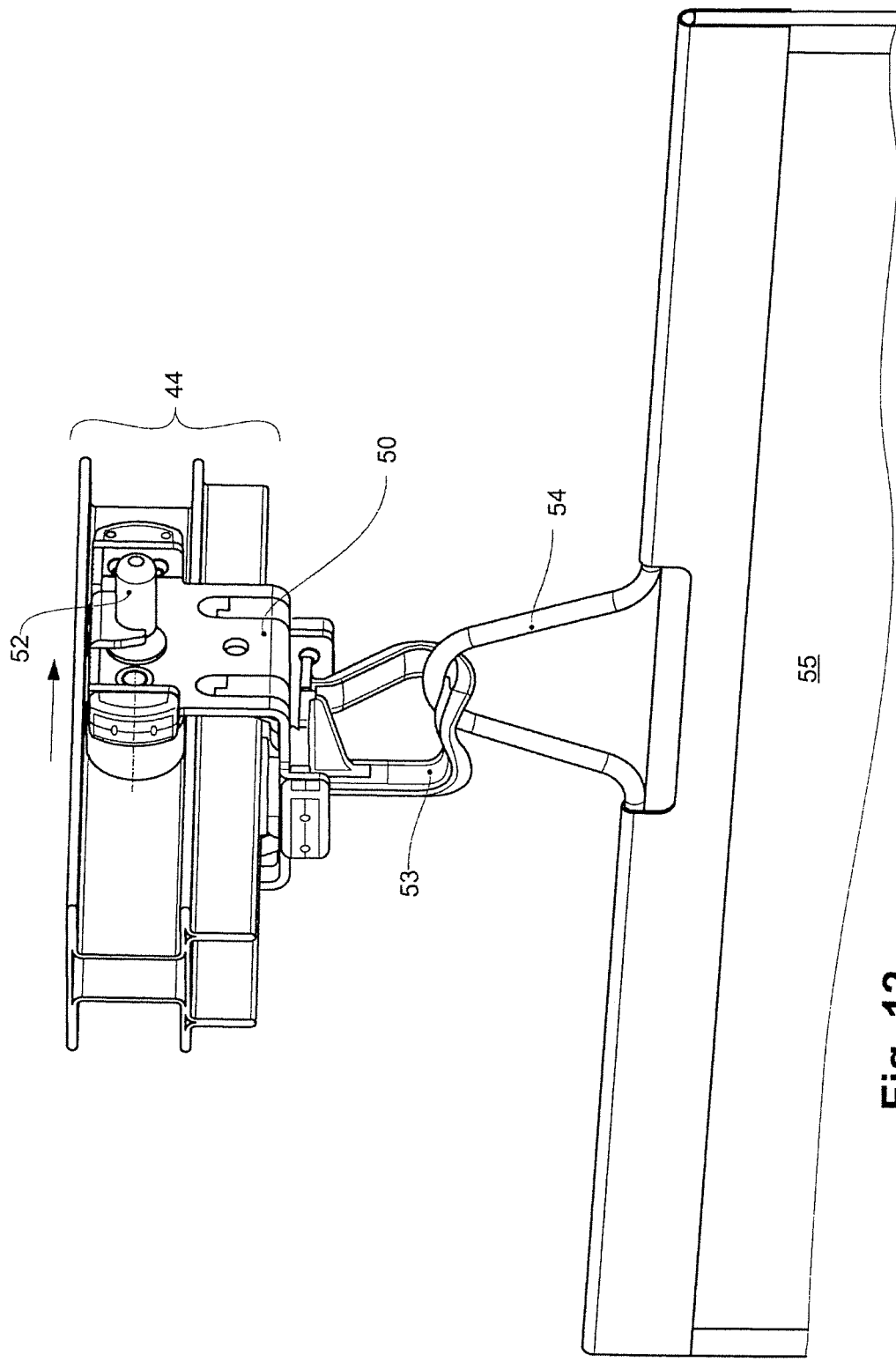
FIG. 12 shows an exemplary conveyor carriage of a continuous conveyor according to FIG. 11, having a transport bag suspended therefrom.

FIG. 12 to this end shows an exemplary carriage 50 of a continuous conveyor according to FIG. 11, having a transport bag 55 suspended thereon. The transport bag 55 is suspended on a carrier bracket 54 which is configured as a hanger in the center and runs through an eyelet 53 on the carriage 50, said eyelet 53 by way of the spatial shaping thereof enabling the carrier bag to be suspended in a stable manner transversely to the longitudinal direction of the running rail as well as parallel with the latter.

The invention claimed is:

1. An order-picking installation (10, 10', 10", 10''') for the order-picking of different goods, in particular goods that are capable of being transported in a suspended state, said order-picking installation (10, 10', 10", 10''') comprising:
   at least one supply station (11) having a plurality of supply locations (35, 36) which for supplying the goods to be order-picked to the order-picking installation (10, 10', 10", 10''') are disposed in parallel; and
   at least one dispatch station (14) having a plurality of dispatch locations (40) which for dispensing the order-picked goods for dispatch are disposed in parallel, wherein at least one temporary store (12; 12.1, 12.2; 12a-d) is provided for order-picking the goods between the supply station (11) and the dispatch station (14), wherein the at least one temporary store (12; 12.1, 12.2; 12a-d) includes a dynamic store (18) for temporarily storing the goods provided for the order-picking, and a standby store (19), downstream of the dynamic store (18), for storing goods which are retrieved from the dynamic store (18) and thereby pre-sorted and which are disposed within a common continuous conveyor (20) and are connected to each other by way of the common continuous conveyor (20).

2. The order-picking installation as claimed in claim 1, further comprising a matrix sorting unit (13) for further sorting is disposed between the temporary store (12; 12.1, 12.2; 12a-d) and the dispatch station (14).

3. The order-picking installation as claimed in claim 1, wherein the continuous conveyor (20) is sub-divided into two regions (UF1, UF2), in that the dynamic store (18) is disposed in one of the two regions (UF1, UF2), and the standby store (19) is disposed in the other of the two regions (UF1, UF2), and in that the continuous conveyor (20) is provided for transporting the goods from the dynamic store (18) to the standby store (18).

4. The order-picking installation as claimed in claim 1, wherein the continuous conveyor (20) comprises a plurality of conveyor sections (20a-d), and in that the dynamic store (18) and the standby store (19) are in each case formed by a plurality of storage sections (23, 26) which as branches depart from predefined conveyor sections (20a, 20c) of the continuous conveyor (20).

5. The order-picking installation as claimed in claim 4, wherein the storage sections (23, 26) comprise in each case one entry and one exit, and in that the storage sections (23, 26) by way of the entry are in each case connected to a first conveyor section (20a, or 20c, respectively), and by way of the exit are in each case connected to a second conveyor section (20c, or 20a, respectively).

6. The order-picking installation as claimed in claim 5, wherein the conveying directions of the first and the second conveyor section (20a, 20c) are mutually opposed.

7. The order-picking installation as claimed in claim 5, wherein the storage sections (23, 26) are connected to the associated conveyor sections (20a, 20c) of the continuous conveyor (20) at the entry side by way of an activatable egress turnout (22, 25) and at the exit by way of an activatable access turnout (24, 27).

8. The order-picking installation as claimed in claim 5, wherein the storage sections (23, 26) are in each case configured as gravity sections which comprise a gradient from the entry to the exit, and on which the conveyed goods by virtue of gravity move in a self-acting manner from the entry to the exit.

9. The order-picking installation as claimed in claim 8, wherein for configuring the gravity sections, the first conveyor sections (20a, or 20c, respectively) run at a first height (h1), the second conveyor sections (20c, or 20a, respectively) run at a second height (h2), and in that the first height (h1) is greater than the second height (h2).

10. The order-picking installation as claimed in claim 9, wherein the storage sections (23, 26) of the dynamic store (18) and of the standby store (19) runs so as to be mutually parallel, in that the storage sections (23) of the dynamic store (18) comprise in each case identical first gradients, in that the storage sections (26) of the standby store (19) comprise in each case identical second gradients, and in that the first gradient and the second gradient are oriented so as to be mutually opposed.

11. The order-picking installation as claimed in claim 10, wherein the continuous conveyor (20) in the transition from the first region (UF1) to the second region (UF2) changes from the second height (h2) to the first height (h1), and in the transition from the second region (UF2) to the first region (UF1) changes from the second height (h2) to the first height (h1).

12. The order-picking installation as claimed in claim 3, wherein the goods to be order-picked for temporary storage and pre-sorting between the two regions (UF1, UF2) of the continuous conveyor (20) by way of an infeed line (30) are capable of being fed into the continuous conveyor (20), and there by way of an outfeed line (31) are also again capable of being retrieved in a pre-sorted state from the standby store (19).

13. The order-picking installation as claimed in claim 5, wherein at least one return section (18; 18a-c) having an associated egress turnout (57; 57a) is provided at the exit of the dynamic store (18) toward the standby store (19), goods in transit from the dynamic store (18) to the standby store (19) by way of said return section (18; 18a-c) being able to be selectively conveyed from the second conveyor section (20c) back to the first conveyor section (20a).

14. The order-picking installation as claimed in claim 1, wherein the continuous conveyor (20) comprises an overhead conveyor.

15. The order-picking installation as claimed in claim 14, wherein the goods to be order-picked in the continuous conveyor (20) are transported in a suspended manner on individual carriages (50) along a running rail (44), and the carriages (50) in the continuous conveyor (20) are moved by a driven conveyor chain (46) which so as to be parallel with the running rail (44) is guided in a dedicated rail (43) and which releasably engages with the carriages (50).

16. The order-picking installation as claimed in claim 15, wherein for transporting the goods to be order-picked, transport bags (55) are configured to be fixedly attached in a suspended manner to the carriages (50), and/or clothes hangers are configured to be releasably attached in a suspended manner to the carriages (50).

17. The order-picking installation as claimed in claim 1, wherein a plurality of temporary stores (12.1, 12.2) operating in parallel are provided in the order-picking installation (10').

18. The order-picking installation as claimed in claim 15, wherein a return (17) of the carriages (50) not impinged with goods from the dispatch station (14) to the supply station (11) is provided.

19. The order-picking installation as claimed in claim 18, wherein at least one empties store (37, 37') for the carriages (50) not impinged with goods is provided in the return (17).

20. The order-picking installation as claimed in claim 1, wherein a controller (56) is provided for the operation of the order-picking installation (10, 10', 10'', 10'''), the controller (56) assembling the respective goods per order as stipulated by the incoming orders, and directing said goods in the assembled form to the dispatch locations (40) in the dispatch station (14).

21. A method for operating an order-picking installation as claimed in claim 1 wherein the goods associated with a plurality of orders are first stored in the dynamic store (18) of the at least one temporary store (12; 12.1, 12.2; 12a-d), then pre-sorted into the standby store (19), and subsequently transferred to the individual dispatch locations (40) in the dispatch station (14) such that all goods associated with one order are present at the respective dispatch location (40).

22. The method as claimed in claim 21, wherein the goods are pre-sorted when in transit from the dynamic store (18) to the standby store (19).

23. The method as claimed in claim 22, wherein the goods which for pre-sorting emanate from the dynamic store (18) are selectively returned to the dynamic store (18) or conveyed onward to the standby store (19).

24. The method as claimed in claim 23, wherein the selective returning of the goods to the dynamic store (18) takes place by way of at least one return section (28; 28a-c) which by way of a controllable egress turnout (57; 57a,b) is connected to the continuous conveyor (20).

* * * * *